UNITED STATES PATENT OFFICE.

RALPH H. McKEE, OF ORONO, MAINE.

PURIFICATION OF LIQUIDS.

1,133,049.   Specification of Letters Patent.   Patented Mar. 23, 1915.

No Drawing. Application filed March 27, 1912, Serial No. 686,670. Renewed August 15, 1914. Serial No. 856,986.

*To all whom it may concern:*

Be it known that I, RALPH H. McKEE, a citizen of the United States, residing at Orono, in the county of Penobscot and State of Maine, have invented certain new and useful Improvements in Purification of Liquids, of which the following is a specification.

This invention relates to methods of purifying liquids and to materials for use in connection with such methods. The term "purifying" is employed in its broadest significance to include decolorizing or de-odorizing aqueous, alcoholic and other liquids, including vegetable oils, eleminating objectionable flavors from beverages or food products, and like applications. The method presents especial advantages in connection with the decolorization of sugar solutions and will be described by reference to this particular application as an illustrative example.

In the well-known soda process for making pulp the wood chips are digested with a solution of sodium hydroxid, the pulp sieved off, and the liquor evaporated and burned in rotary furnaces. The resulting mass, commonly known as "black-ash," is then extracted with water and the sodium carbonate solution thus obtained is causticized by lime. The leached black-ash, hereinafter referred to as "black-ash residue," is generally discarded, although attempts have been made to burn it as fuel.

I have discovered that this black-ash residue possesses considerable decolorizing powers, and may be used directly to replace bone-char or bone-black in many or all applications. I have also discovered that the decolorizing power of the black-ash residue may be materially increased by either heating it to redness out of contact with air, in substantially the same manner as is practised in the revivification of bone-char, or by suitable treatment with dilute acids, or by a combination of these treatments.

The original black-ash residue consists principally of carbon, but varies in its content of non-combustible matter (ash) from somewhat over one per cent. to about five per cent., the average of several commercial samples examined being approximately 3.5 per cent. After treatment for one hour with a hot one per cent. solution of hydrochloric acid this ash content was reduced to 0.8— 0.9 per cent. At the same time the efficiency of the residue as a purifying agent was greatly increased, being in some instances approximately trebled.

Comparing such acid-treated material with commercial grades of bone-char, under similar conditions as regards time and temperature of treatment and degree of subdivision of the decolorizing agent, it is found that the black-ash product yields liquors which are materially lighter in color. For example, in the treatment of a twenty-two per cent. solution of Muscavado sugars from Brazil, the purified solution was found to contain only one-half to one-third of the coloring matter which remained after treatment by bone-char under similar conditions. In addition to this advantage, it is found that the filtrate from the bags runs clear or free from minute suspended particles sooner than is the case with bone-char; and also that by the use of the black-ash product a larger volume of syrup may be treated before the bags become clogged.

Revivification of the once used product by heating it to redness in closed vessels in the manner usually practised for the treatment of bone-char yields a product having approximately the same efficiency as the original material.

The acid-treated black-ash product possesses the decided advantage, as compared with bone-char, that it does not yield any material quantity of calcium or other salts under the solvent action of acid syrups. It follows from this that its use renders possible a greater percentage yield of crystallizable sugar, it being well understood in the art that the salts derived from bone-char have the effect of limiting the yield of crystallized sugar. This fact is also of great advantage in the treatment of other liquids having strong solvent powers.

In addition to its application for decolorizing sugar solutions, the described product is effective for the treatment of all liquids for which bone-char may be used, and so far as is now known, is considerably more effective in all cases; and in certain instances it has proven to possess approximately ten times the efficiency of bone-char. It is capable of removing both odors and flavors: for example, it possesses about twice the efficiency of bone-char for the elimination of hydrogen sulfid from water. It is also effective for removing the color and disagreeable flavor from cottonseed and similar oils, yielding with medium-grade cottonseed oil a product which is satisfactory for culinary use. Glycerin, raw alcohol, and other liquids or solutions are also effectively purified.

I claim:—

1. The method of purifying liquids, which consists in subjecting the same to the action of black-ash residues.

2. The method of purifying liquids, which consists in subjecting the same to the action of acid-treated black-ash residues.

3. The method of purifying liquids, which consists in subjecting the same to the action of black-ash residues previously heated to redness.

4. The method of decolorizing sugar solutions, which consists in subjecting the same to the action of black-ash residues.

5. The method of decolorizing sugar solutions, which consists in subjecting the same to the action of acid-treated black-ash residues.

6. The method of decolorizing sugar solutions, which consists in subjecting the same to the action of black-ash residues previously heated to redness.

7. The hereindescribed product for the purification of liquids, consisting of black-ash residues substantially free from acid-soluble constituents.

8. The hereindescribed product for the purification of liquids, consisting of black-ash residues substantially free from volatile constituents.

9. The hereindescribed product for the purification of liquids, consisting of black-ash residues substantially free from acid-soluble and volatile constituents.

10. The method of preparing a product adapted for the purification of liquids, which consists in subjecting black-ash residues to an acid treatment.

11. The method of preparing a product adapted for the purification of liquids, which consists in heating black-ash residues to redness.

12. The hereindescribed method which consists in purifying black-ash residues, and applying the resulting product to the purification of liquids.

In testimony whereof I affix my signature in presence of two witnesses.

RALPH H. McKEE.

Witnesses:
LLOYD M. BURGHART,
ARTHUR M. BUSWELL.